United States Patent
Ryu et al.

(10) Patent No.: US 8,855,383 B2
(45) Date of Patent: Oct. 7, 2014

(54) LESION DIAGNOSIS APPARATUS AND METHOD TO DETERMINE REGULARITY OF SHAPE OF LESION

(75) Inventors: Seung-Woo Ryu, Seoul (KR); Jin-Man Park, Yongin-si (KR); Do-Young Kim, Suwon-si (KR); Ji-Sang Yu, Seoul (KR); Dae-Myung Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 13/488,653

(22) Filed: Jun. 5, 2012

(65) Prior Publication Data

US 2013/0170718 A1    Jul. 4, 2013

(30) Foreign Application Priority Data

Jan. 3, 2012    (KR) ........................ 10-2012-0000609

(51) Int. Cl.
*G06K 9/00*    (2006.01)

(52) U.S. Cl.
USPC .......................................................... 382/128

(58) Field of Classification Search
None
See application file for complete search history.

(56) References Cited

U.S. PATENT DOCUMENTS

| | | | | |
|---|---|---|---|---|
| 4,771,469 A | * | 9/1988 | Wittenburg | .................. 382/203 |
| 2006/0269111 A1 | * | 11/2006 | Stoecker et al. | .............. 382/128 |
| 2007/0014447 A1 | | 1/2007 | Hubschmann | |
| 2008/0089472 A1 | | 4/2008 | Yoon | |
| 2010/0021068 A1 | * | 1/2010 | Chang et al. | .................. 382/199 |
| 2011/0085714 A1 | | 4/2011 | Yan et al. | |
| 2011/0286643 A1 | * | 11/2011 | Kislal | ............................ 382/128 |
| 2013/0109953 A1 | * | 5/2013 | Wehnes et al. | ................ 600/407 |

FOREIGN PATENT DOCUMENTS

| | | |
|---|---|---|
| KR | 10-2008-0031257 | 4/2008 |
| KR | 10-0830549 | 5/2008 |
| KR | 20-0447267 | 1/2010 |
| WO | WO 2009/091160 A2 | 7/2009 |

OTHER PUBLICATIONS

Do Hyun Chung and Guillermo Sapiro, "Segmenting Skin Lesions with Partial-Differential-Equations-Based Image Processing Algorithms", Jul. 2000, IEEE Transactions on Medical Imaging, vol. 19, No. 7, pp. 763-767.*

* cited by examiner

*Primary Examiner* — Bhavesh Mehta
*Assistant Examiner* — Siamak Harandi
(74) *Attorney, Agent, or Firm* — NSIP Law

(57) ABSTRACT

A lesion diagnosis apparatus and method to determine a regularity of a shape of a lesion are provided. The lesion diagnosis apparatus to determine a regularity of a shape of a lesion, includes a lesion area detecting unit configured to form a lesion area by selecting virtual points along a boundary of a lesion included in an image, and a lesion diagnosing unit configured to determine the regularity of the shape of the lesion by analyzing a correlation of the selected virtual points.

20 Claims, 11 Drawing Sheets

LESION DIAGNOSIS APPARATUS AND METHOD TO DETERMINE REGULARITY OF SHAPE OF LESION

CROSS-REFERENCE TO RELATED APPLICATIONS

This application claims the benefit under 35 U.S.C. §119 (a) of Korean Patent Application No. 10-2012-0000609, filed on Jan. 3, 2012, in the Korean Intellectual Property Office, the entire disclosure of which is incorporated herein by reference for all purposes.

BACKGROUND

1. Field

The following description relates to lesion diagnosis, and, for example, to a lesion diagnosis apparatus and method to determine regularity of a shape of a lesion.

2. Description of Related Art

Ultrasonic wave images, in which tissues of the body are imaged through an application of ultrasonic waves, may allow detection or diagnosis of lesions in the tissues to which the ultrasonic waves are applied. The applied ultrasonic waves may be completely reflected or absorbed inside a certain group of tissues. As a result, tissues disposed behind the group of tissues that are completely reflecting or absorbing the applied ultrasonic waves will not be represented in an ultrasonic wave image.

However, as a difference in impedance between the two tissues increases, ultrasonic waves that are reflected may increase, and ultrasonic waves that penetrate and are absorbed may decrease. Accordingly, with respect to an increase in reflected ultrasonic waves, an acoustic shadow, referred to as a posterior acoustic shadow (PAS), is generated in rear portions of two boundary surfaces of the tissues. The PAS can be seen with respect to bones in the body, visceral gases, gallstones, and the like.

Types of lesions may be diagnosed using this phenomenon. To accurately diagnose a lesion in a medical image, a shape of the lesion must be clearly identified. However, lesions may be generated in a variety of different shapes. As a result, it may be difficult for a computer aided diagnosis (CAD) system to automatically and accurately detect the shape of a lesion. Accordingly, there is an increasing need for a technology that will enable a lesion in a medical image to be distinguished in an effective and efficient manner.

SUMMARY

In one general aspect, there is provided a lesion diagnosis apparatus to determine a regularity of a shape of a lesion, the apparatus including a lesion area detecting unit configured to form a lesion area by selecting virtual points along a boundary of a lesion included in an image, and a lesion diagnosing unit configured to determine the regularity of the shape of the lesion by analyzing a correlation of the selected virtual points.

The general aspect of the lesion diagnosis apparatus may further provide that the correlation of the selected virtual points is analyzed through directivity vectors corresponding to the selected virtual points.

The general aspect of the lesion diagnosis apparatus may further provide that the correlation of the selected virtual points is analyzed through angles corresponding to the virtual points.

The general aspect of the lesion diagnosis apparatus may further provide that the correlation of the selected virtual points is analyzed through lengths corresponding to the virtual points.

The general aspect of the lesion diagnosis apparatus may further provide that the correlation of the selected virtual points is analyzed through areas corresponding to the virtual points.

The general aspect of the lesion diagnosis apparatus may further provide that the correlation of the selected virtual points is analyzed through directivity vectors, angles, lengths, areas, or a combination of two or more thereof corresponding to the selected virtual points.

The general aspect of the lesion diagnosis apparatus may further provide that the lesion diagnosing unit is further configured to determine the regularity of the shape of the lesion by analyzing a pattern of vectors having directivity and passing from each of the selected virtual points to a neighboring one of each of the selected virtual points.

The general aspect of the lesion diagnosis apparatus may further provide that the lesion diagnosing unit includes a vector forming unit, a pattern analyzing unit, and a regularity determining unit, the vector forming unit being configured to form the vectors having directivity by connecting each of the selected virtual points to the neighboring one of each of the selected virtual points in a clockwise or counterclockwise orientation, the pattern analyzing unit being configured to analyze a directivity pattern of the formed vectors, the regularity determining unit being configured to determine the regularity of the shape of the lesion based on the analyzed directivity pattern of the formed vectors.

The general aspect of the lesion diagnosis apparatus may further provide that the lesion diagnosing unit further includes a pattern rule storing unit configured to store patterns corresponding with shapes of lesions, and rules respectively corresponding thereto, the regularity determining unit being further configured to compare the analyzed directivity pattern of the formed vectors and the stored rules to determine the regularity of the shape of the lesion to be regular or irregular.

The general aspect of the lesion diagnosis apparatus may further provide that the lesion diagnosing unit further includes a pattern rule learning unit configured to learn the stored rules respectively corresponding to the stored patterns, and accumulate knowledge of the stored rules in the pattern rule storing unit through supervised identification of the regularity of the shape of the lesion according to the stored patterns respectively corresponding to the stored rules.

The general aspect of the lesion diagnosis apparatus may further provide that the stored rules respectively corresponding to the stored patterns indicate a regularity of a shape of the stored patterns.

The general aspect of the lesion diagnosis apparatus may further provide that the lesion diagnosing unit includes a first straight line forming unit, a second straight line forming unit, a first intersection point detecting unit, a second intersection point detecting unit, a distance computing unit, and a regularity determining unit, the first straight line forming unit being configured to form first straight lines that pass through a center of a virtual oval, the first straight lines dividing the virtual oval along a major or a minor axis into n sections at a predetermined angle with respect to each other, the virtual oval including as many of the selected virtual points as possible, the second straight line forming unit being configured to form second straight lines respectively connecting each of neighboring ones of the selected virtual points as pairs, the first intersection point detecting unit being configured to detect first intersection points at intersections of each of the first straight lines and the second straight lines, the second intersection point detecting unit being configured to detect second intersection points at intersections of each of the first straight lines and a circumference of the virtual oval, the distance computing unit being configured to compute differences between first lengths from each of the first intersection points to the center of the virtual oval and second lengths from each of the second intersection points to the center of the virtual oval, and compute an average of the differences between each of the first lengths and each of the second lengths, the regularity determining unit being configured to compare the average of the differences with a threshold value to determine the regularity of the shape of the lesion.

The general aspect of the lesion diagnosis apparatus may further provide that the regularity determining unit is further configured to determine the regularity of the shape of lesion to be irregular if the average of the differences is greater than or equal to the threshold value.

The general aspect of the lesion diagnosis apparatus may further provide that the lesion diagnosing unit includes a y-distance computing unit and a regularity determining unit, the y-distance computing unit being configured to compute differences in y-coordinates between each of the selected virtual points and a corresponding point of a circumference of a virtual oval, the virtual oval including as many of the selected virtual points as possible, the selected virtual points and each respective corresponding point of the circumference having the same x-coordinate, the regularity determining unit being configured to compare a sum of all differences in y-coordinates with a threshold value to determine the regularity of shape of the lesion.

The general aspect of the lesion diagnosis apparatus may further provide that the regularity determining unit is further configured to determine regularity of the shape of the lesion to be irregular if the sum of all differences is greater than or equal to the threshold value.

The general aspect of the lesion diagnosis apparatus may further provide that the lesion diagnosing unit includes a straight line forming unit, a first area computing unit, a second area computing unit, an area difference computing unit, and a regularity determining unit, the straight line forming unit being configured to form one or more first straight lines and one or more second straight lines that, respectively, pass through neighboring ones of the selected virtual points and a center of a virtual oval figure, the virtual oval figure including as many of the selected virtual points as possible, the first area computing unit being configured to compute areas of triangles respectively formed by the first straight lines, the second straight lines, and third straight lines formed by connecting the neighboring ones of the selected virtual points through which the first and the second straight lines pass, respectively, the second area computing unit being configured to compute areas of arcs of the virtual oval respectively formed by the first straight lines and the second straight lines, the area difference computing unit being configured to compute area differences, respectively, between the areas of the triangles and the areas of the arcs, the area difference computing unit being further configured to compute an average of the area differences, the regularity determining unit being configured to compare the average of the area differences with a threshold value to determine the regularity of shape of the lesion.

The general aspect of the lesion diagnosis apparatus may further provide that the regularity determining unit is further configured to determine the regularity of the shape of the lesion as to be irregular if the average of the area differences is greater than or equal to the threshold value.

In another general aspect, there is provided a lesion diagnosis method to determine regularity of a shape of a lesion in a lesion diagnosis apparatus, the method including forming a lesion area by selecting virtual points along a boundary of a lesion included in an image, and determining the regularity of the shape of the lesion by analyzing a correlation of the selected virtual points.

The general aspect of the lesion diagnosis method may further provide that the correlation of the selected virtual points is analyzed through one of directivity vectors, angles, lengths, and areas corresponding to the selected virtual points.

The general aspect of the lesion diagnosis method may further provide that the correlation of the selected virtual points is analyzed through directivity vectors, angles, lengths, areas, or a combination of two or more thereof corresponding to the selected virtual points.

Other features and aspects may be apparent from the following detailed description, the drawings, and the claims.

Figure 1:
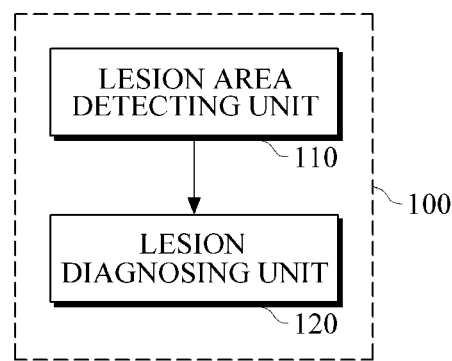
FIG. 1 is a diagram illustrating an example of a lesion diagnosis apparatus to determine regularity of a shape of a lesion.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. In addition, descriptions of well-known functions and constructions may be omitted for increased clarity and conciseness.

FIG. 1 is a diagram illustrating an example of a lesion diagnosis apparatus 100 to determine a regularity of a shape of a lesion. The apparatus 100 may diagnose a lesion by analyzing medical images acquired by a medical imaging apparatus (not shown) such as an ultrasonic detector, a magnetic resonance imaging (MRI) device, a computed tomography (CT) device, and the like.

The apparatus 100 includes a lesion area detecting unit 110 and a lesion diagnosing unit 120. The lesion area detecting unit 110 and the lesion diagnosing unit 120 may be logically or physically integrated into one device, or logically or physically separate from each other, as is shown in the example illustrated in FIG. 1.

Figure 2:
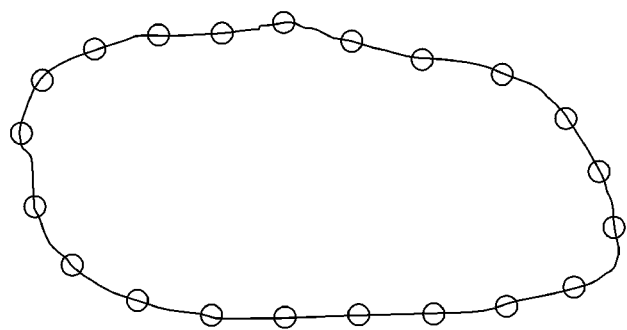
FIG. 2 is a diagram illustrating an example of virtual points selected along a boundary of a lesion included in a medical image.

The lesion area detecting unit 110 may define a lesion area by connecting virtual points selected along a boundary of a lesion included in a medical image. The selected virtual points may be disposed at regular intervals or at irregular, arbitrary intervals. FIG. 2 is a diagram illustrating an example of virtual points selected along a boundary of a lesion included in a medical image. As shown in FIG. 2, the virtual points are selected at arbitrary intervals.

The lesion diagnosing unit 120 may determine a regularity of a shape by analyzing a correlation of the virtual points selected by the lesion area detecting unit 110. Generally, a lesion having an irregular shape is more likely to be malignant. The correlation of the selected virtual points may be analyzed by directional vector analysis, angle analysis, length analysis, area analysis, or a combination of two or more thereof.

Figure 3:
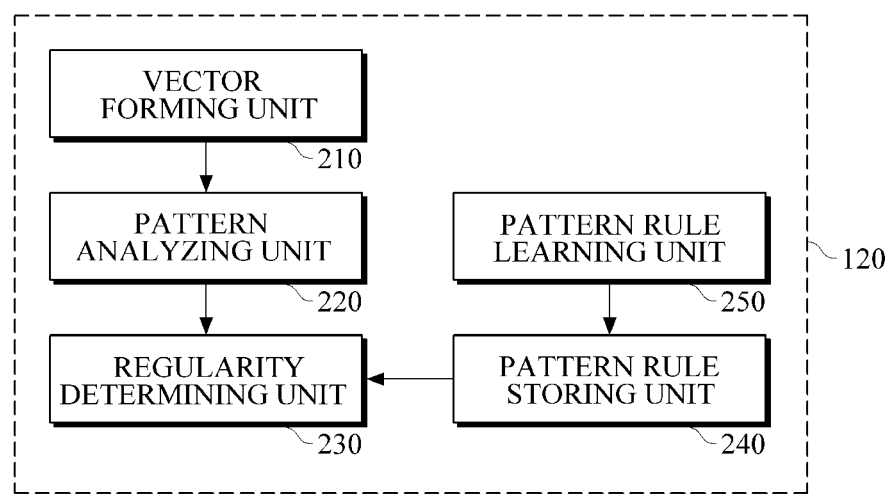
FIG. 3 is a diagram illustrating an example of a lesion diagnosing unit in the lesion diagnosis apparatus of FIG. 1.

FIG. 3 is a diagram illustrating an example of a lesion diagnosing unit 120 in the lesion diagnosis apparatus 100 of FIG. 1. The lesion diagnosing unit 120 of FIG. 3 may determine a regularity of a shape of a lesion by analyzing a pattern of directional vectors that pass through the selected virtual points. The lesion diagnosing unit 120 of FIG. 3 includes a vector forming unit 210, a pattern analyzing unit 220, and a regularity determining unit 230.

Figure 4:
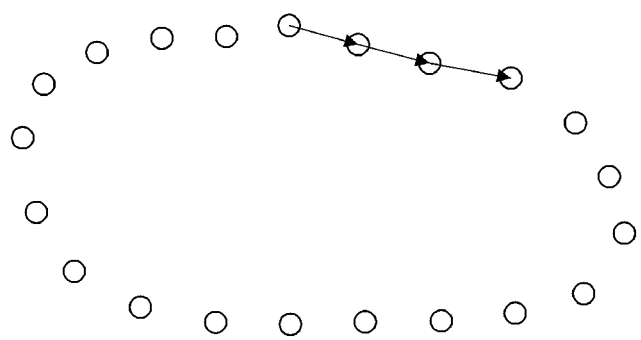
FIG. 4 is a diagram illustrating an example of formation of vectors having directivity through clockwise connection of neighboring virtual points.

The vector forming unit 210 may connect virtual points clockwise or counterclockwise to form vectors having directivity. FIG. 4 is a diagram illustrating an example of formation of vectors having directivity through clockwise connection of neighboring virtual points.

The pattern analyzing unit 220 may analyze a directivity pattern of the vectors formed by the vector forming unit 210. For example, a pattern may be defined according to a direction of a vector by connecting neighboring virtual points. If it is defined that an upper-left direction is represented as "a," an upper-right direction is represented as "b," a lower-right direction is represented as "c," and a lower-left direction is represented as "d," a vector directivity pattern of virtual points being selected along a boundary of a lesion and connected with each other clockwise may be represented as "aaaaaabbbbbbbccccccddddd" clockwise from 9 o'clock.

The regularity determining unit 230 may determine the shape regularity of a lesion based on the analysis of directivity pattern of vectors by the pattern analyzing unit 220. In other words, the regularity determining unit 230 may compare the analyzed directivity pattern of the vectors with patterns of regularity previously stored, and determine whether a lesion shape is regular or irregular based on a comparison result. For example, if the analyzed directivity pattern of the vectors is "aaddaaabaabbbccbbccbbbccccddccdddddd" and the same or similar pattern has been stored as a pattern corresponding to an irregular lesion shape, the regularity determining unit 230 may determine the lesion shape corresponding with the analyzed directivity pattern of the vectors to be irregular.

The lesion diagnosing unit 120 of FIG. 3 further includes a pattern rule storing unit 240. The pattern rule storing unit 240 stores patterns corresponding with shapes of lesions, and rules corresponding thereto. For example, with respect to patterns corresponding with particular lesion shapes, each of the patterns is assigned a unique identification number and stored in the pattern rule storing unit 240. In this example, the regularity determining unit 230 may compare the directivity pattern of the vectors analyzed by the pattern analyzing unit 220 with the stored patterns according to the corresponding rules stored in the pattern rule storing unit 240, and determine whether the lesion shape is regular or irregular based on an analysis result.

The lesion diagnosing unit 120 of FIG. 3 further includes a pattern rule learning unit 250. The pattern rule learning unit 250 may learn pattern rules and accumulate knowledge of the pattern rules in the pattern rule storing unit 240. For example, the pattern rule learning unit 250 may identify a lesion as a regular lesion or an irregular lesion using a supervised learning method, thereby accumulating knowledge of the pattern rules.

Figure 5:
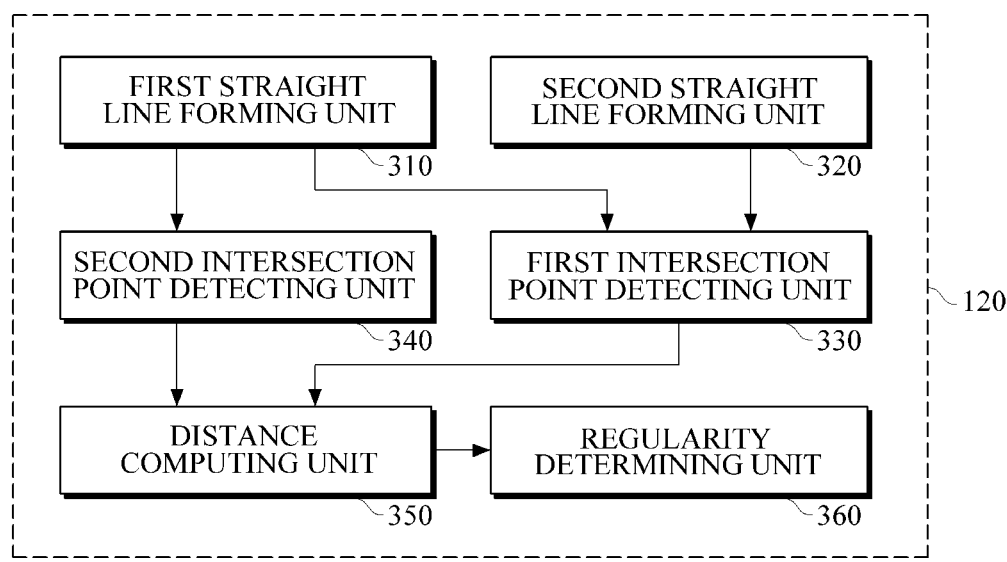
FIG. 5 is a diagram illustrating another example of a lesion diagnosing unit in the lesion diagnosis apparatus of FIG. 1.

FIG. 5 is a diagram illustrating another example of a lesion diagnosing unit 120 in a lesion diagnosis apparatus 100 of FIG. 1. A lesion diagnosing unit 120 of FIG. 5 may determine shape regularity of a lesion based on angles formed with respect to the selected virtual points. The lesion diagnosing unit 120 of FIG. 5 includes a first straight line forming unit 310, a second straight line forming unit 320, a first intersection point detecting unit 330, a second intersection point detecting unit 340, a distance computing unit 350, and a regularity determining unit 360.

The first straight line forming unit 310 may form first straight lines by dividing a virtual oval figure along a major or a minor axis into n sections at a predetermined angle with respect to each other. The virtual oval includes as many of the selected virtual points as possible, so that the first straight lines pass through a center of the virtual oval figure and are spaced apart at the predetermined angle from each other.

Figure 6:
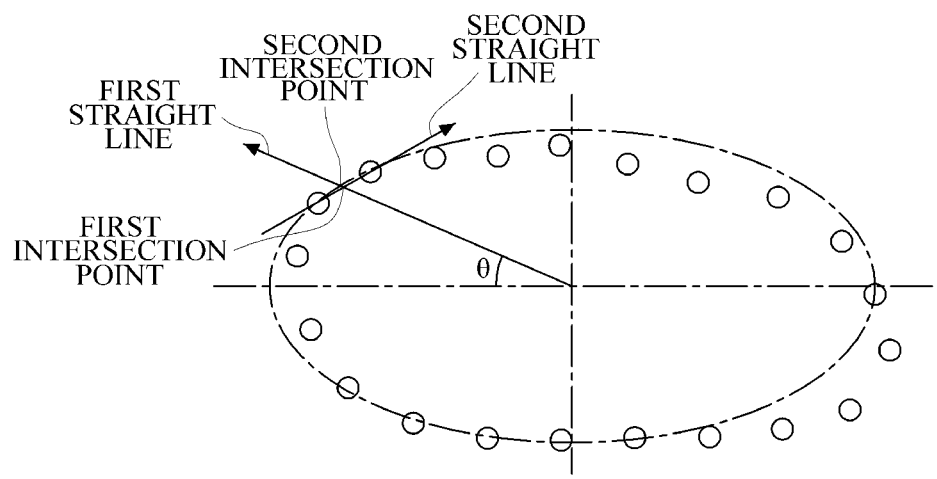
FIG. 6 is a diagram illustrating an example of determination of a regularity of a shape of a lesion based on angles formed with respect to virtual points selected along a boundary of a lesion.

FIG. 6 is a diagram illustrating an example of determination of a regularity of a shape of a lesion based on angles formed with respect to virtual points selected along a boundary of the lesion. Referring to FIG. 6, a first straight line is formed to pass through a center of a virtual oval by dividing the virtual oval along a major or a minor axis into n sections at a predetermined angle θ with respect to each other.

The second straight line forming unit 320 may form a second straight line by connecting neighboring ones of the selected virtual points. Referring to FIG. 6, the second straight line is formed by connecting neighboring ones of the selected virtual points.

The first intersection point detecting unit 330 may detect first intersection points where the first straight line formed by the first straight line forming unit 310 crosses the corresponding second straight line formed by the second straight line forming unit 320. In FIG. 6, an example of the first intersection point, at which the first straight line intersects with the corresponding second straight line, is shown.

The second intersection point detecting unit 340 may detect second intersection points where the first straight line formed by the first straight line forming unit 310 intersects with a circumference of the virtual oval. In FIG. 6, an example of the second intersection point, at which the first straight line intersects with the circumference of the virtual oval, is shown.

Referring to FIG. 6, a one-dimensional equation with respect to the first straight line may be obtained from a condition that coordinates of the center of the oval are (0,0) and an angle from the major axis to the first straight line is θ. A one-dimensional equation with respect to the second straight line may be obtained from the coordinates of the neighboring ones of the selected virtual points.

In addition, referring to FIG. 6, since first intersection points are obtained from a simultaneous system of the one-dimensional equations for the respective first and second straight lines, and lengths of the major axis and the minor axis are identified, an equation with respect to the oval may be obtained as well. The second intersection point may be obtained from a simultaneous system of the equation for the oval and the one-dimensional equation for the first straight line.

The distance computing unit 350 may compute distance differences between first lengths from each of the first intersection points to the center of the oval and second lengths from each of the second intersection points to the center of the oval, and compute an average of distance differences.

The first straight lines and the second straight lines are spaced at the predetermined angle θ. Through the above procedures, the first distances, the second distances, and the average of distance differences between the first distances and the second distances may be computed.

The regularity determining unit 360 may compare the average of distance differences with a threshold to determine a regularity of a shape of the lesion. If the average of distance differences is equal to or greater than the threshold, the regularity determining unit 360 may determine that the lesion shape is irregular. That is, the regularity determining unit 360 may determine the regularity of the shape of the lesion based on a geometrical characteristic asserting that a difference between the actual lesion and the virtual oval corresponds with the distance difference between the first lengths and the second lengths.

In a case of an exceptionally large lesion, there may be a likelihood of an error in determining a regularity of a shape of the lesion based on angles with respect to the virtual points selected along the boundary of the lesion. In this case, the error may be reduced by a very fine subdivision of angles, but the amount of computation increases as the subdivided angle becomes finer. Therefore, by combining the aforementioned analysis based on vector patterns having directivity or the forthcoming mentioning of the analysis based on areas with respect to the virtual points selected along the boundary of the lesion and the above-described analysis based on angles, the error may be avoided.

Figure 7:
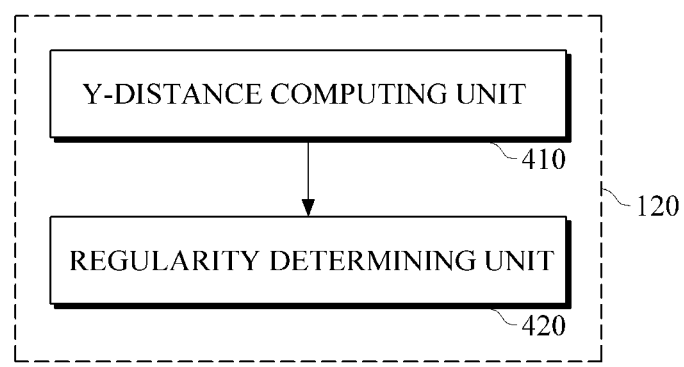
FIG. 7 is a diagram illustrating yet another example of a lesion diagnosing unit in the lesion diagnosis apparatus of FIG. 1.

FIG. 7 is a diagram illustrating yet another example of a lesion diagnosing unit 120 in a lesion diagnosis apparatus 100 of FIG. 1. A lesion diagnosing unit 120 of FIG. 7 may determine a regularity of a shape of a lesion based on lengths with respect to the selected virtual points. The lesion diagnosing unit 120 of FIG. 7 includes a y-distance computing unit 410 and a regularity determining unit 420.

The y-distance computing unit 410 may compute differences in y-coordinates between each of the virtual points and a corresponding point of a circumference of a virtual oval. The virtual oval includes as many of the selected virtual points as possible. The selected virtual points and each respective corresponding point of the circumference have the same x-coordinate.

Figure 8:
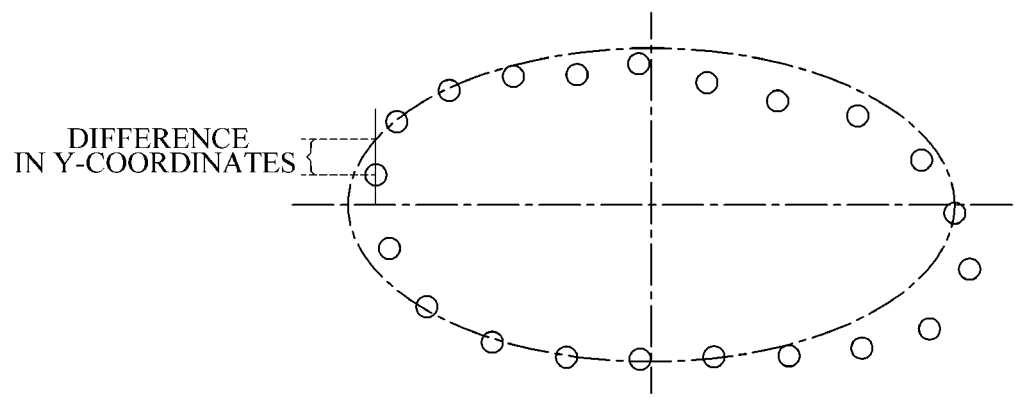
FIG. 8 is a diagram illustrating an example of determination of a regularity of a shape of a lesion through lengths with respect to virtual points selected along a boundary of the lesion.

FIG. 8 is a diagram illustrating an example of determination of a regularity of a shape of a lesion through lengths with respect to virtual points selected along a boundary of the lesion. Referring to FIG. 8, a difference in y-coordinates between a virtual point and a circumference of an oval is shown where the virtual point and a point on the circumference have the same x-coordinate.

The regularity determining unit 420 may compare the sum of all of the differences in y-coordinates that are computed by the y-distance computing unit 410 with a threshold to determine the shape regularity of the lesion. If the sum of the differences is equal to or greater than the threshold, the regularity determining unit 420 may determine that the lesion is an irregular lesion. That is, the regularity determining unit 420 may determine the regularity of the shape of the lesion based on a geometrical characteristic asserting that a difference between the actual lesion and the virtual oval corresponds with the sum of the differences in y-coordinates between each of the virtual points and the circumference of the virtual oval at the same respective x-coordinates.

Figure 9:
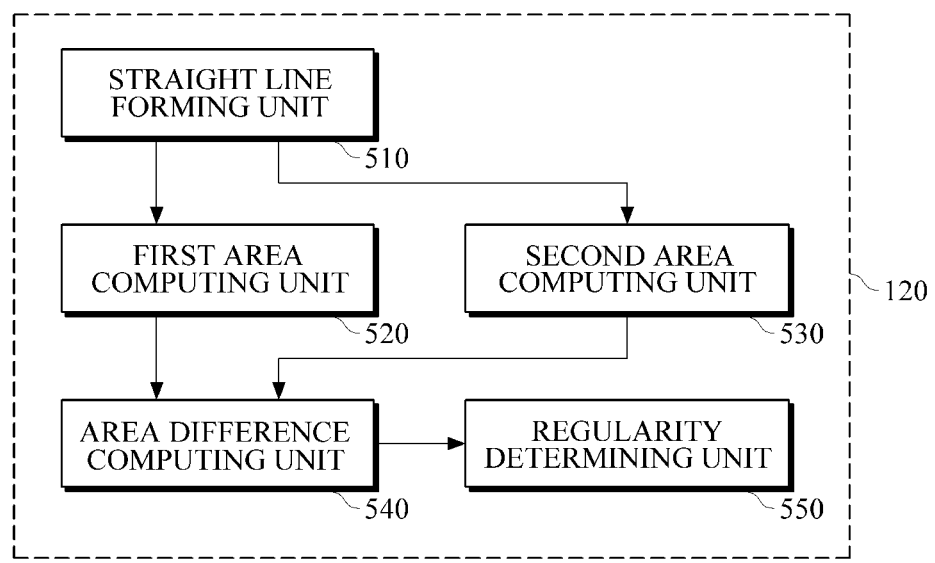
FIG. 9 is a diagram illustrating still another example of a lesion diagnosing unit in the lesion diagnosis apparatus of FIG. 1.

FIG. 9 is a diagram illustrating still another example of a lesion diagnosing unit 120 in a lesion diagnosis apparatus 100 of FIG. 1. A lesion diagnosing unit 120 of FIG. 9 may determine a regularity of a shape of a lesion based on areas formed with respect to selected virtual points. The lesion diagnosing unit 120 of FIG. 9 includes a straight line forming unit 510, a first area computing unit 520, a second area computing unit 530, an area difference computing unit 540, and a regularity determining unit 550.

The straight line forming unit 510 may form one or more first straight lines and one or more second straight lines, which, respectively, pass through neighboring selected virtual points, and a center of a virtual oval that includes as many of the selected virtual points as possible.

Figure 10:
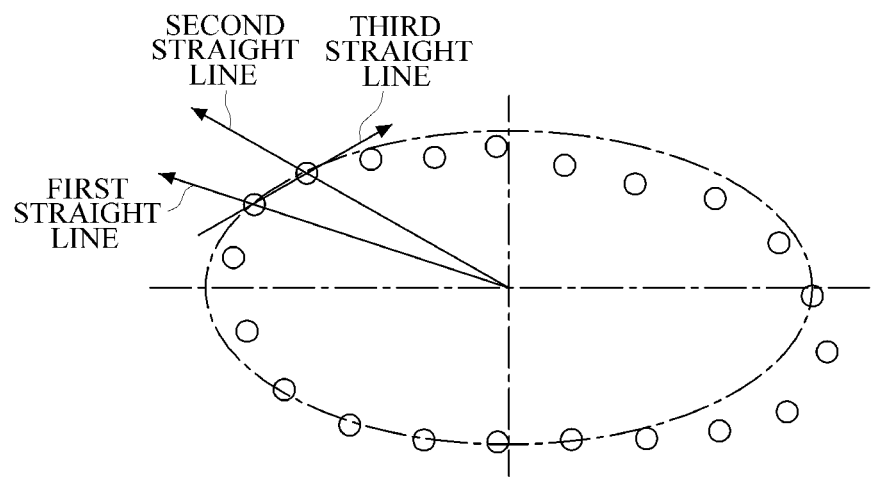
FIG. 10 is a diagram illustrating an example of determination of a regularity of a shape of a lesion through areas formed with respect to virtual points selected along a boundary of a lesion.

FIG. 10 is a diagram illustrating an example of determination of a regularity of a shape of a lesion through areas formed with respect to virtual points selected along a boundary of a lesion. In the example illustrated in FIG. 10, a first straight line and a second straight line extend from a center of a virtual oval to the respective neighboring virtual points on the boundary of the lesion.

The first area computing unit 520 may compute an area of a triangle formed by the first straight line, the second straight line, and a third straight line that is formed by connecting the neighboring virtual points through which the first and the second straight lines pass, respectively. The example illustrated in FIG. 10 shows a triangle formed by the first straight line, the second straight line, and the third straight line.

Under the assumption that coordinates of the center of the virtual oval are (0,0), it is possible to obtain coordinates of the two neighboring virtual points. Further, one-dimensional equations for the first straight line and the second straight line may be obtained from the known coordinates. In addition, since the coordinates of the two neighboring virtual points are known, a one-dimensional equation for the third straight line may be obtained. The area of the triangle formed by the first, the second, and the third straight lines may be obtained from a simultaneous system of the three one-dimensional equations.

The second area computing unit 530 may compute an area of an arc of the virtual oval formed by the first straight line and the second straight line. An equation for the virtual oval can be obtained from lengths of a major axis and a minor axis of the virtual oval. The area of the arc of the virtual oval formed by the first and the second straight lines may be obtained from a simultaneous system of the equation for the virtual oval and the one-dimensional equations for the first and the second straight lines.

The area difference computing unit 540 may compute a difference between the area of the triangle and the area of the arc, thereby computing an average of area differences.

The regularity determining unit 550 may compare the average of area differences with a threshold to determine the regularity of the shape of the lesion. If the average of area difference is equal to or greater than the threshold, the regularity determining unit 550 may determine the lesion to be an irregular lesion. That is, the regularity determining unit 550 may determine the regularity of the shape of the lesion based on a geometrical characteristic asserting that a difference between the actual lesion and the virtual oval, when the first straight line and the second straight line extend from the center of the virtual oval to the respective virtual points on the boundary of the lesion and the third straight line connects the two neighboring virtual points, corresponds with the average of area difference between the area of the triangle formed by the first straight line, the second straight line, and the third straight line and the area of the arc of the virtual oval formed by the first straight line and the second straight line.

With respect to the above-referenced descriptions, if difficulties are experienced forming a definite and appropriate virtual oval shape, the shape regularity of a lesion may be determined based on only a vector pattern having directivity with respect to the selected virtual points.

Figure 11:
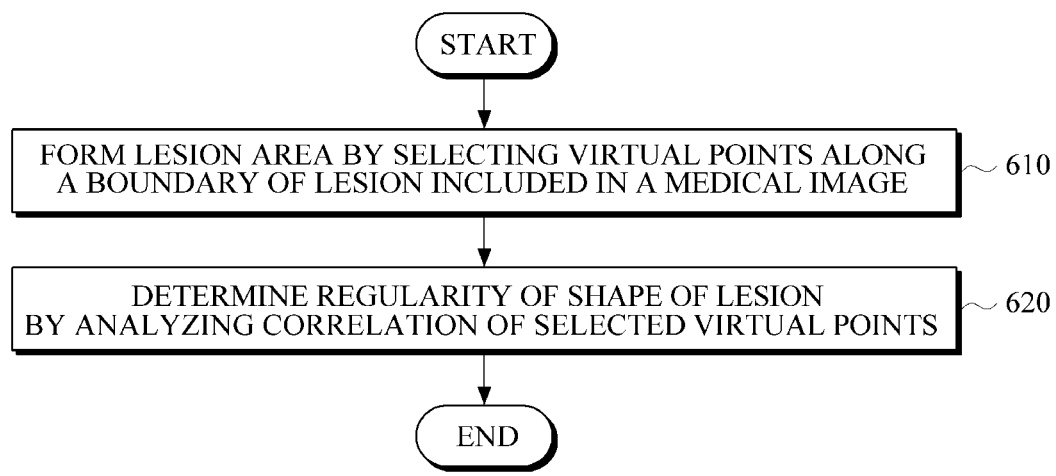
FIG. 11 is a flowchart illustrating an example of a lesion diagnosis method to determine regularity of a shape of a lesion in a lesion diagnosis apparatus.

FIG. 11 is a flowchart illustrating an example of a lesion diagnosis method to determine a regularity of a shape of a lesion in a lesion diagnosis apparatus. A lesion area is formed (610) by selecting virtual points along a boundary of a lesion. The formation of the lesion area is already described above, and, thus, the detailed description thereof will not be reiterated. A correlation is analyzed (620) among the selected virtual points to determine a regularity of a shape of the lesion. Generally, a lesion having an irregular shape is more likely to be malignant.

The correlation analysis may be through use of vectors, angles, lengths, areas, or a combination of two or more thereof with respect to the selected virtual points. The determination of a regularity of a shape through these modes of analysis has already been described above, and, thus, the detailed descriptions thereof will not be reiterated.

According to teachings above, there is provided a method to determine regularity of a shape of a lesion in a lesion diagnosis apparatus, through which a lesion may be accurately diagnosed.

According to teachings above, there is provided a lesion diagnosing apparatus including a lesion diagnosing unit that, through the determining of whether a lesion shape is regular or irregular based on an analysis of vector directivity patterns with respect to virtual points selected along a boundary of the lesion, may accurately diagnose lesions.

According to other teachings above, there is provided a lesion diagnosing apparatus including a lesion diagnosing unit that, through the determining of whether a lesion shape is regular or irregular based on angles formed with respect to virtual points selected along a boundary of the lesion, may accurately diagnose lesions.

According to yet other teachings above, there is provided a lesion diagnosis apparatus including a lesion diagnosing unit that, through the determining of whether a lesion shape is regular or irregular based on lengths with respect to virtual points selected along a boundary of the lesion, may accurately diagnose lesions.

According to still other teachings above, there is provided a lesion diagnosis apparatus including a lesion diagnosing unit that, through the determining of whether a lesion shape is regular or irregular based on areas with respect to virtual points selected along the boundary of the lesion, may accurately diagnose lesions.

The units described herein may be implemented using hardware components such as processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data that can be thereafter read by a computer system or a processing device. Examples of the computer readable recording medium include read-only memory (ROM), random-access memory (RAM), CD-ROMs, magnetic tapes, floppy disks, optical data storage devices. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A lesion diagnosis apparatus to determine a regularity of a shape of a lesion, the apparatus comprising:
   a lesion area detecting processor configured to form a lesion area by selecting virtual points along a boundary of a lesion included in an image; and
   a lesion diagnosing processor configured to determine the regularity of the shape of the lesion by analyzing a correlation of the selected virtual points,
   wherein the correlation of the selected virtual points is analyzed through angles corresponding to the selected virtual points, lengths corresponding to the selected virtual points, areas corresponding to the selected virtual points, or any combination of two or more thereof corresponding to the selected virtual points, in relation to a virtual oval.

2. The lesion diagnosis apparatus of claim 1, wherein the lesion diagnosing processor comprises a first straight line forming processor, a second straight line forming processor, a first intersection point detecting processor, a second intersection point detecting processor, a distance computing processor, and a regularity determining processor, the first straight line forming processor being configured to form first straight lines that pass through a center of the virtual oval, the first straight lines dividing the virtual oval along a major or a minor axis into n sections at a predetermined angle with respect to each other, the virtual oval including as many of the selected virtual points as possible, the second straight line forming (processor being configured to form second straight lines respectively connecting each of neighboring ones of the selected virtual points as pairs, the first intersection point detecting processor being configured to detect first intersection points at intersections of each of the first straight lines and the second straight lines, the second intersection point detecting processor being configured to detect second intersection points at intersections of each of the first straight lines and a circumference of the virtual oval, the distance computing processor being configured to compute differences between first lengths from each of the first intersection points to the center of the virtual oval and second lengths from each of the second intersection points to the center of the virtual oval, and compute an average of the differences between each of the first lengths and each of the second lengths, the regularity determining processor being configured to compare the average of the differences with a threshold value to determine the regularity of the shape of the lesion.

3. The lesion diagnosis apparatus of claim 2, wherein the regularity determining processor is further configured to determine the regularity of the shape of lesion to be irregular if the average of the differences is greater than or equal to the threshold value.

4. The lesion diagnosis apparatus of claim 1, wherein the lesion diagnosing processor comprises a y-distance computing processor and a regularity determining processor, the y-distance computing processor being configured to compute differences in y-coordinates between each of the selected virtual points and a corresponding point of a circumference of a virtual oval, the virtual oval including as many of the selected virtual points as possible, the selected virtual points and each respective corresponding point of the circumference having the same x-coordinate, the regularity determining processor being configured to compare a sum of all differences in y-coordinates with a threshold value to determine the regularity of shape of the lesion.

5. The lesion diagnosis apparatus of claim 4, wherein the regularity determining processor is further configured to determine regularity of the shape of the lesion to be irregular if the sum of all differences is greater than or equal to the threshold value.

6. The lesion diagnosis apparatus of claim 1,
   wherein the lesion diagnosing processor comprises a straight line forming processor, a first area computing processor, a second area computing processor, an area difference computing processor, and a regularity determining processor, the straight line forming processor being configured to form one or more first straight lines and one or more second straight lines that, respectively, pass through neighboring ones of the selected virtual points and a center of a virtual oval figure, the virtual oval figure including as many of the selected virtual points as possible, the first area computing processor being configured to compute areas of triangles respectively formed by the first straight lines, the second straight lines, and third straight lines formed by connecting the neighboring ones of the selected virtual points through which the first and the second straight lines pass, respectively, the second area computing processor being configured to compute areas of arcs of the virtual oval respectively formed by the first straight lines and the second straight lines, the area difference computing processor being configured to compute area differences, respectively, between the areas of the triangles and the areas of the arcs, the area difference computing processor being further configured to compute an average of the area differences, the regularity determining processor being configured to compare the average of the area differences with a threshold value to determine the regularity of shape of the lesion.

7. The lesion diagnosis apparatus of claim 6, wherein the regularity determining processor is further configured to determine the regularity of the shape of the lesion as to be irregular if the average of the area differences is greater than or equal to the threshold value.

8. A lesion diagnosis apparatus to determine a regularity of a shape of a lesion, the apparatus comprising;
   a lesion area detecting processor configured to form a lesion area by selecting virtual points along a boundary of a lesion included in an image; and
   a lesion diagnosing processor configured to determine the regularity of the shape of the lesion by analyzing a correlation of the selected virtual points,
   wherein the correlation of the selected virtual points is analyzed through directivity vectors corresponding to the selected virtual points,
   wherein the lesion diagnosing processor is further configured to determine the regularity of the shape of the lesion by analyzing a pattern of vectors having directivity and passing from each of the selected virtual points to a neighboring one of each of the selected virtual points, and
   wherein the lesion diagnosing processor comprises a vector forming processor, a pattern analyzing processor, and a regularity determining processor, the vector forming processor being configured to form the vectors having directivity by connecting each of the selected virtual points to the neighboring one of each of the selected virtual points in a clockwise or counterclockwise orientation, the pattern analyzing processor being configured to analyze a directivity pattern of the formed vectors, the regularity determining processor being configured to determine the regularity of the shape of the lesion based on the analyzed directivity pattern of the formed vectors.

9. The lesion diagnosis apparatus of claim 8, wherein the lesion diagnosing processor further comprises a pattern rule storing processor configured to store patterns corresponding with shapes of lesions, and rules respectively corresponding thereto, the regularity determining processor being further configured to compare the analyzed directivity pattern of the formed vectors and the stored rules to determine the regularity of the shape of the lesion to be regular or irregular.

10. The lesion diagnosis apparatus of claim 9, wherein the lesion diagnosing processor further comprises a pattern rule learning processor configured to learn the stored rules respectively corresponding to the stored patterns, and accumulate knowledge of the stored rules in the pattern rule storing processor through supervised identification of the regularity of the shape of the lesion according to the stored patterns respectively corresponding to the stored rules.

11. The lesion diagnosis apparatus of claim 9, wherein the stored rules respectively corresponding to the stored patterns indicate a regularity of a shape of the stored patterns.

12. A lesion diagnosis method to determine regularity of a shape of a lesion in a lesion diagnosis apparatus, the method comprising:
    forming a lesion area by selecting virtual points along a boundary of a lesion included in an image; and
    determining the regularity of the shape of the lesion by analyzing a correlation of the selected virtual points,
    wherein the correlation of the selected virtual points is analyzed through directivity vectors, angles, lengths, areas, or any combination of two or more thereof corresponding to the selected virtual points.

13. A lesion diagnosis method of claim 12, wherein the determining the regularity of the shape of the lesion comprises analyzing a pattern of vectors having directivity and passing from each of the selected virtual points to a neighboring one of each of the selected virtual points, the method further comprising:
    forming the vectors having directivity by connecting each of the selected virtual points to the neighboring one of each of the selected virtual points in a clockwise or counterclockwise orientation,
    analyzing a directivity pattern of the formed vectors,
    determining the regularity of the shape of the lesion based on the analyzed directivity pattern of the formed vectors.

14. A lesion diagnosis method of claim 13, further comprising:
    storing patterns corresponding with shapes of lesions, and rules respectively corresponding thereto,
    comparing the analyzed directivity pattern of the formed vectors and the stored rules to determine the regularity of the shape of the lesion to be regular or irregular.

15. A lesion diagnosis method of claim 12, further comprising:
    forming first straight lines that pass through a center of a virtual oval, the first straight lines dividing the virtual oval along a major or a minor axis into n sections at a predetermined angle with respect to each other, the virtual oval including as many of the selected virtual points as possible,
    forming second straight lines respectively connecting each of neighboring ones of the selected virtual points as pairs,
    detecting first intersection points at intersections of each of the first straight lines and the second straight lines,
    detecting second intersection points at intersections of each of the first straight lines and a circumference of the virtual oval,
    computing differences between first lengths from each of the first intersection points to the center of the virtual oval and second lengths from each of the second intersection points to the center of the virtual oval,
    computing an average of the differences between each of the first lengths and each of the second lengths, and
    comparing the average of the differences with a threshold value to determine the regularity of the shape of the lesion.

16. A lesion diagnosis method of claim 15, further comprising determining the regularity of the shape of lesion to be irregular if the average of the differences is greater than or equal to the threshold value.

17. A lesion diagnosis method of claim 12, further comprising:
    computing differences in y-coordinates between each of the selected virtual points and a corresponding point of a circumference of a virtual oval, the virtual oval including as many of the selected virtual points as possible, the selected virtual points and each respective corresponding point of the circumference having the same x-coordinate, and
    comparing a sum of all differences in y-coordinates with a threshold value to determine the regularity of shape of the lesion.

18. A lesion diagnosis method of claim 17, further comprising determining regularity of the shape of the lesion to be irregular if the sum of all differences is greater than or equal to the threshold value.

19. A lesion diagnosis method of claim 12, further comprising:
    forming one or more first straight lines and one or more second straight lines that, respectively, pass through neighboring ones of the selected virtual points and a center of a virtual oval figure, the virtual oval figure including as many of the selected virtual points as possible,
    computing areas of triangles respectively formed by the first straight lines, the second straight lines, and third straight lines formed by connecting the neighboring ones of the selected virtual points through which the first and the second straight lines pass, respectively,
    computing areas of arcs of the virtual oval respectively formed by the first straight lines and the second straight lines,
    computing area differences, respectively, between the areas of the triangles and the areas of the arcs,
    computing an average of the area differences, and
    comparing the average of the area differences with a threshold value to determine the regularity of shape of the lesion.

20. A lesion diagnosis method of claim 19, further comprising determining regularity of the shape of the lesion to be irregular if the sum of all differences is greater than or equal to the threshold value.

* * * * *